US008298845B2

(12) United States Patent
Childress

(10) Patent No.: US 8,298,845 B2
(45) Date of Patent: Oct. 30, 2012

(54) MOTION PLATFORM VIDEO GAME RACING AND FLIGHT SIMULATOR

(76) Inventor: Robert Childress, Chandler, AZ (US)

( * ) Notice: Subject to any disclaimer, the term of this patent is extended or adjusted under 35 U.S.C. 154(b) by 939 days.

(21) Appl. No.: 12/343,017

(22) Filed: Dec. 23, 2008

(65) Prior Publication Data

US 2009/0163283 A1 Jun. 25, 2009

Related U.S. Application Data

(60) Provisional application No. 61/008,951, filed on Dec. 24, 2007.

(51) Int. Cl.
*A63F 9/24* (2006.01)
*A63F 13/00* (2006.01)
*G06F 17/00* (2006.01)
*G06F 19/00* (2011.01)

(52) U.S. Cl. ............................................ 438/47; 438/46
(58) Field of Classification Search ................ 463/6, 30, 463/46, 47; 434/49, 55, 62
See application file for complete search history.

(56) References Cited

U.S. PATENT DOCUMENTS

| 3,967,387 A | 7/1976 | Marchegiani |
| 5,022,708 A | 6/1991 | Nordela et al. |
| 5,195,746 A * | 3/1993 | Boyd et al. .......................... 463/37 |
| 5,513,990 A | 5/1996 | Gluck |
| 5,901,612 A | 5/1999 | Letovsky |
| 5,919,045 A | 7/1999 | Tagge et al. |
| 6,027,342 A | 2/2000 | Brown |
| 6,210,164 B1 | 4/2001 | Otto |
| 2004/0023718 A1 * | 2/2004 | Kondo et al. .................... 463/30 |
| 2005/0069839 A1 | 3/2005 | Denne |

OTHER PUBLICATIONS

Unknown Author, Team Radical Motion Simulator, printout of a web site. Found at http://www.x-simulator.de/forum/radical-motion-simulator-t84..., 8 Pages.
Unknown Author, Dreamflyer, printout of website information. Found at http://www.mydreamflyer.com/, 4 Pages.
Unknown Author, Simcraft-Blur-the-Line, printout of website information. Found at http://www.simcraft.com, 23 Pages.
Ken "Hardlock" Hill, Joyrider, Build Your Own Joyrider Virtual Flyer, Accutone Services, 2001, 51 Pages.
Robert Childress, Collection of Images of Simulators, 4 Pages.
Machine Design, "NASCAR simulators keep it real," Feb. 9, 2006.

(Continued)

*Primary Examiner* — N Drew Richards
*Assistant Examiner* — Grant Withers

(57) ABSTRACT

A motion platform configured as automobile racing vehicle simulator is disclosed. The apparatus that embodies the geometry and various methods of articulation related to a motion platform having advantageous geometric relationships are also set forth. In one embodiment enhanced performance of a motion-generating device having a rider or driver is accomplished through the location of the center of mass of a payload as near as practicable to the pivotal center of the payload support. The device has a base supporting an upstanding column and a sled pivotally mounted to the top of the column. The rider is accommodated on the sled. To achieve the event simulated results intended various acts are performed in configuring the motion platform. These include locating a pivotal center of motion on a column in a position above the base of the motion generating device; locating the position of a center of mass, the center of mass calculated from the mass of the sled and the mass of a rider accommodated on the sled; and mounting the sled on the pivotal center of motion of the device such that the located center of mass is close to the pivotal center of motion of the motion platform.

23 Claims, 9 Drawing Sheets

OTHER PUBLICATIONS

New Your Times, "Simulated Racing Provides Real Edge," Mar. 4, 2007.
ATDC, SimCraft: Enhancing Video Games Through Motion, Oct. 20, 2006.
LOQUO, Racing Simulator, NASCAR Simulator, Racecar Simulator (Spain) 2007.
www,enterleisure.co.uk/f1sims.htm, GP Simulators, May 8, 2007.
www.trinity-racing.com/page3.html, Race Frame Gold.

* cited by examiner

MOTION PLATFORM VIDEO GAME RACING AND FLIGHT SIMULATOR

CROSS REFERENCE TO RELATED APPLICATION

This application claims priority in previously filed provisional application 61/008,951, filed Dec. 24, 2007, herein incorporated in its entirety.

BACKGROUND OF THE INVENTION

1. Field of the Invention

This invention concerns the geometry of motion platforms configured as automobile racing vehicle simulators and to the apparatus that embodies the geometry and various methods of articulation related to a motion platform having the geometric relationships set forth in this disclosure.

In this device the relationship between a center of mass and a pivotal center is used to provide energy efficient and realistic simulated motion translation to a driver of a video game racecar simulator presented on a motion platform. One element of the invention leading to an improved device is that the center of mass of a payload is maintained proximate the pivotal center of the motion platform. This arrangement of having the center of mass of the payload located proximate the pivotal center of the device allows for less energy expenditure requirements in the movement of the payload on its pivotal center. In addition to race car simulator motion platforms there are other motion platform related simulators such as, but not limited to, aircraft flight simulators, roller coaster and amusement ride simulators, sailboat, speedboat and ship piloting simulators, animal ride simulators, skiing, surfing and water skiing simulators, motorcycle and bicycle simulators, tank and military equipment simulators, spacecraft flying, docking and landing simulators and construction equipment simulators, to name a few of the simulators that would benefit from incorporation of the ideas set forth herein or logical extensions of what is set forth in this specification.

2. Description of Related Art

Simulated automobile racing devices utilizing motion platforms has become a popular recreational activity. This has generated a need and desire in individuals for acquiring hardware and software having performance capabilities that can lead to and enhance personal enjoyment and rewarding group dynamic interactive situations. There are numerous companies selling a broad array of hardware and software products into the racecar and other activity simulator market. These companies sell expensive, high quality, and high functionality simulator components. Such components and devices include steering wheels, stationary cockpit frames conjuring up the driver's race car environment, and helmets with audio input connected to the output of the simulation activity or game that is engaged by the simulator participant. Also marketed are pedal sets that include accelerator, brake and clutch pedals and steering wheel or steering column mounted shifting paddles. Available seats used in some simulators are identical to seats used in actual racing cars. Instrumentation packages, both analog and digital gauges and indicator lights, and speaker systems are also readily available to simulator devotees. The racing simulation equipment attempts to create a hyper-realistic racing experience.

There are clubs, teams, events, and Internet based racing leagues throughout the world. These leagues have thousands of participants involved in all types of simulated racing and other motion dependent or motion enhanced activities. Participants compete against other players throughout the world and interact in real time with other drivers. Some software programs and related responsive apparatus is so sophisticated that the driver/participant can make adjustments, such as suspension adjustments, engine performance selections, gear ratio changes, simulated tire changes (simulating a pit stop in a car race scenario), and the like, from inside the simulated race car cockpit.

In the simulator market, wherein more than a million people participate on-line on a frequent basis, there is a need for a very highly developed and sophisticated racecar simulator motion platform that incorporates hardware controls as well as game setup and control switches and actuators into a single apparatus. Racecar simulators are expensive devices largely due to the cost of the actuation systems used in the motion platform. Such actuation systems may be hydraulic systems, using reservoirs, pumps, hydraulic cylinders, valves and conduits operating under high line pressures. Hydraulic systems are expensive to build and require frequent maintenance. They also are prone to hydraulic fluid leaks, noisy and generate heat. In most cases such systems are commercial installations and are not commonly used in the home consumer market.

Motion platforms are designed to provide motion in several degrees of freedom. The number of degrees of freedom in a particular simulator is related to the cost and complexity of the device. The more degrees of freedom the more complex and expensive a simulator will be. With the invention presented here the cost of the motion platform used in the race car simulator is contained by providing two true degrees of freedom and simulating at least three more degrees of freedom. The additional virtual and perceived degrees of freedom (heave, surge and sway) are components of the two true degrees of freedom (pitch and roll). Pitch and roll movement and positioning causes a gravity force to act on the occupant that is perceived by the occupant as acceleration, deceleration, and centrifugal force. Heave, surge, and sway are physical re-positioning movements that are perceived directly by the occupant as physical re-positioning and require no re-interpretation.

An appreciation of the scope of the simulator market can be gleaned from the following articles. An article in Machine Design, "NASCAR simulators keep it real," Feb. 9, 2006, incorporated herein by reference, discusses a hydraulically actuated simulator. In this article the deficiencies of low-cost arcade-type motion technologies that rely on electric motor driven gear systems is presented. Since motion reversals in such systems are unnaturally abrupt these electric motor driven motion platforms are considered less desirable than hydraulic pump and actuator motor systems. In another article; Bernstein, V., "Simulated Racing Provides Real Edge," New York Times, Mar. 4, 2007, general simulator information is presented. This article is also incorporated by reference herein in its entirety.

To reduce the complexity and length of the Detailed Specification, and to fully establish the state of the art in certain areas of technology, Applicant herein expressly incorporates by reference all of the following materials identified below.

Many patents have been issued on embodiments of motion platforms, such as U.S. Pat. Nos. 3,967,387; 5,919,045; 5,901,612; 6,027,342 and 6,210,164. These patents are herein incorporated by reference.

Applicant believes that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37

CFR 1.57(c)(1)-(3), applicant will amend the specification to expressly recite the essential material that is incorporated by reference as allowed by applicable rules.

SUMMARY OF THE INVENTION

A pure two degrees of freedom motion platform, also having several simulated degrees of freedom, is provided. The energy efficiency and motion translations possible by locating the center of mass of a payload to the center of pivotal rotation of the motion platform is one aspect of the invention. In one iteration of the invention the center of mass of a payload is located proximate a fixed center of pivotal rotation. By locating these centers proximate each other the actuating force required to move the payload on the pivotal center is minimized. By minimizing the force required to articulate the payload the motion platform can use relatively less horsepower producing prime movers than are used in motion platforms that don't have the center of mass of the payload proximate the center of pivotal rotation. This relationship enables the use of efficient, compact prime movers. In one embodiment these prime movers can be fractional horsepower motors. These motors can provide a realistic simulator experience.

The motion platform configured using the invention described herein, as a racecar simulator for instance, provides a hyper-realistic entertainment experience to a driver seated in a seat on an articulated sled. The sled is pivotally mounted on a base for movement through several degrees of freedom by electrical motors driving gearhead reduction devices. This invention is directed to enhancing high-end video games communicating with a motion platform where motion is useful in projecting realism through motion input to the game player. Actuation of a sled portion of the motion platform using significantly lower forces than is needed in the actuation of other motion platforms is made possible by this invention. A very responsive, yet power efficient motion platform is provided by locating the center of mass of moving components, including the mass of the player—the combination of these two masses representing a payload—close to a fixed location pivotal center of the motion platform. The present invention provides, among other things, a two-axis motion platform having pure roll and pure pitch and also including heave, sway and surge degrees of freedom that are a beneficial artifact of the geometry of the two-axis device presented here.

Complex motion platforms are six-axis machines having independent pitch, yaw, roll, heave, sway and surge motions. Such six-access machines are complex, too expensive for home-centric consumer markets or for low cost public novelty game centers. The large footprint six-axis motion simulators are unnecessary to fulfill the performance requirements of the intended marketing target of a simulated racing car experience to which this invention is directed. Thus a two-axis motion platform, with perceived heave, sway and surge degrees of freedom, as would be expected in a six-access motion platform, is presented here. The presented geometric relationship and the benefits thereof are useful in providing a device marketable into the racing car and flight simulator consumer market and selected commercial markets. One version, suitably equipped, of the simulator presented herein could be used in commercial research or as a sophisticated training simulator where the benefits of low cost and low power requirement benefit the user community. The geometry presented herein allows the construction of low cost alternatives to more complex machines while still providing a faithful simulation of motion found in real situations.

The motion platform is made up of two main components including, but not limited to, a base and a sled component. The sled is mounted above the base on a universal joint supported on a pillar. The universal joint is located by design and layout to be close to the center of mass of the sled when an operator is seated in a seat on the sled. The mass of the sled and the mass of an operator accommodated on the sled, combine to represent a payload. The center of mass of the payload will be dependent on the mass of the operator but this center of mass of the payload will be located, in one embodiment of this invention, at or near, the pivotal center of the motion platform. This invention provides an energy and cost effective motion platform actuation system that uses "off-the-shelf" motors, gearheads, (or unified motor and gearhead assemblies such as are preferred in one version of this invention) and two true degrees of freedom but with the capability of providing, to a usable extent, three other degrees of freedom, that being heave, sway and surge.

It is an object of this invention to provide a motion platform where the center of mass of a payload supported on the motion platform is proximate the pivotal center of the motion platform.

It is also an object of this invention to provide a motion platform where the center of mass of a payload supported on the motion platform is within a one-inch radius of the pivotal center of the motion platform.

It is an object of this invention to provide a motion platform where the center of mass of a payload supported on the motion platform is less than one inch in radius from the pivotal center of the motion platform.

It is an object of this invention to provide a motion platform where the center of mass of a payload supported on the motion platform is more than one inch in radius from the pivotal center of the motion platform.

Another object of the invention is to locate the pivotal center of a motion platform sled above the deck of the sled portion of the motion platform.

A further object of the invention is to provide a motion platform that requires less energy than other motion platforms to articulate the sled of the motion platform.

Also an object of the invention is to provide a racing simulator or flight simulator that provides realistic motion simulating vehicle motion using fractional horsepower motors and actuation elements to provide two true degrees of freedom and three simulated degrees of freedom.

One goal of this invention is to simulate a live experience using a motion platform that provides motion that closely mimics motion experienced in a real vehicle.

Another object of the invention is to provide a motion platform that provides performance attributes of more expensive motion platforms.

Also an advantage of the invention is that the sled of the motion platform is supported through a pivot point located vertically above the horizontal plane of the sled.

It is also an object of the invention to provide a motion platform having pitch and roll.

It is also an object of the invention to provide a five-axis motion platform including true pitch, true roll and simulated heave, sway and surge.

It is an object of this invention to provide a motion platform comprising a base and a pillar mounted to and extending from the base. A universal joint is attached to the top end of the pillar. The motion platform includes a sled having a deck surface with a stanchion mounted to the sled and extending above the sled's deck surface. The universal joint at the top of the pillar is attached to an internal mounting location at the upper end of, and inside, the stanchion.

According to the preset invention, the above and other objects of minimizing the force necessary to move a payload on a pivotal support, and all the ancillary advantages thereof, may be achieved using a method involving the act of locating the center of mass of the payload proximate, for instance, but not limited to having the center of mass of the payload exactly on or within a three inch radius from of the pivotal center of a universal joint on an upwardly extending the pillar.

Further, according to the present invention, the above and other objects of supporting a sled on the base of a motion platform may be achieved using a method involving the acts of providing an upwardly extending pillar extending from the base to the sled and providing a universal joint at the upper end of the pillar. The pillar is attached to the interior of a stanchion carried on the sled by attaching the universal joint at the upper end of the pillar to the stanchion.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define the invention. To the contrary, if the provisions of 35 U.S.C. §112, ¶6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE DRAWINGS

Referring to the detailed description and the following illustrative figures will enable an understanding of the present invention. In the figures like reference numbers refer to like elements or like acts throughout the figures.

Elements in the figures are illustrated for simplicity and have not necessarily been rendered according to any particular sequence or embodiment.

DETAILED DESCRIPTION OF THE INVENTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

The following description is directed to a race car simulation motion platform. Those skilled in the art will appreciate that the description of the race car simulation is readily adaptable to other simulation scenarios, such as, but not limited to, those described above.

Figure 1:
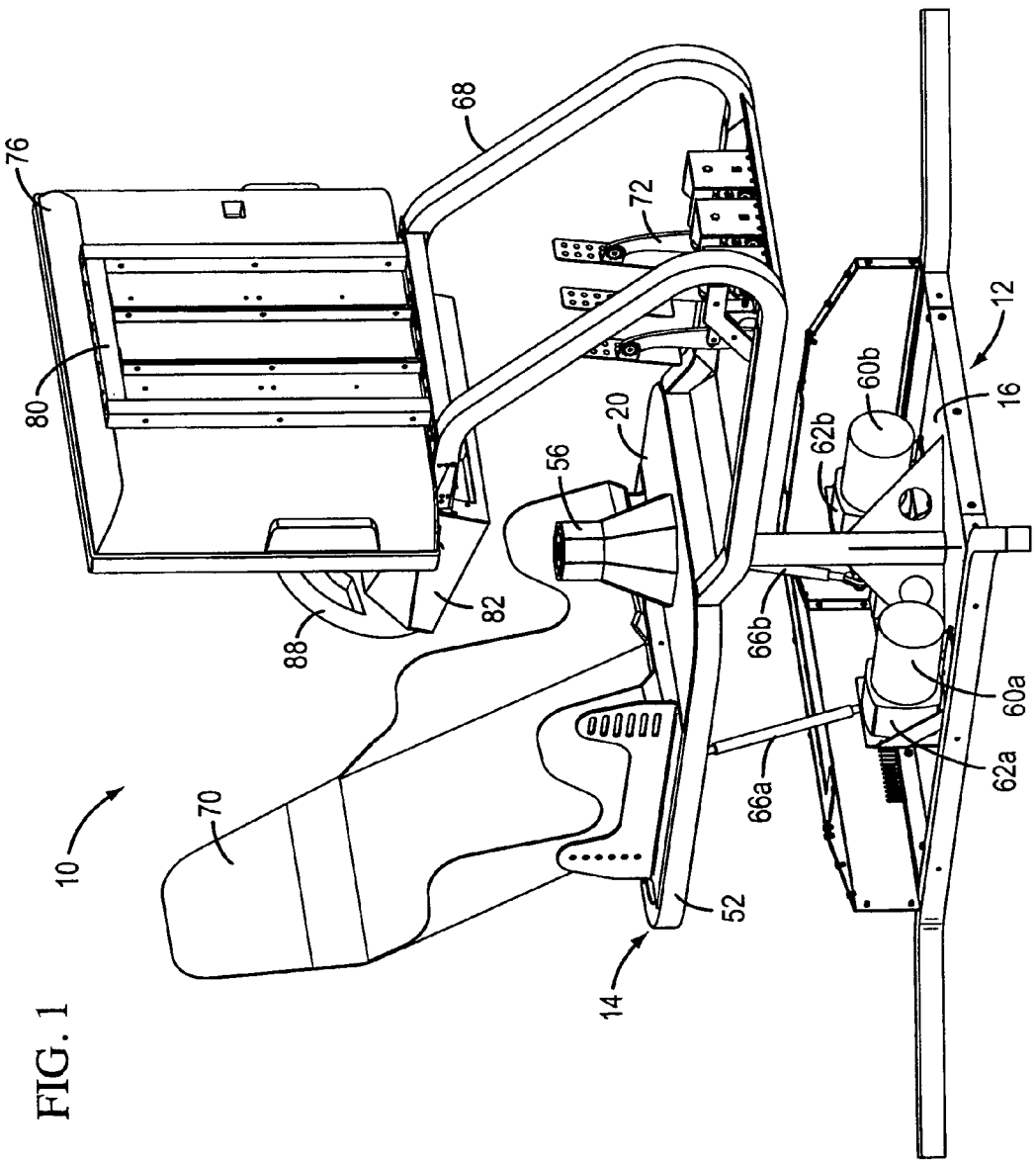
FIG. 1 depicts a motion platform configured as a racecar driving simulator.
Figure 2:
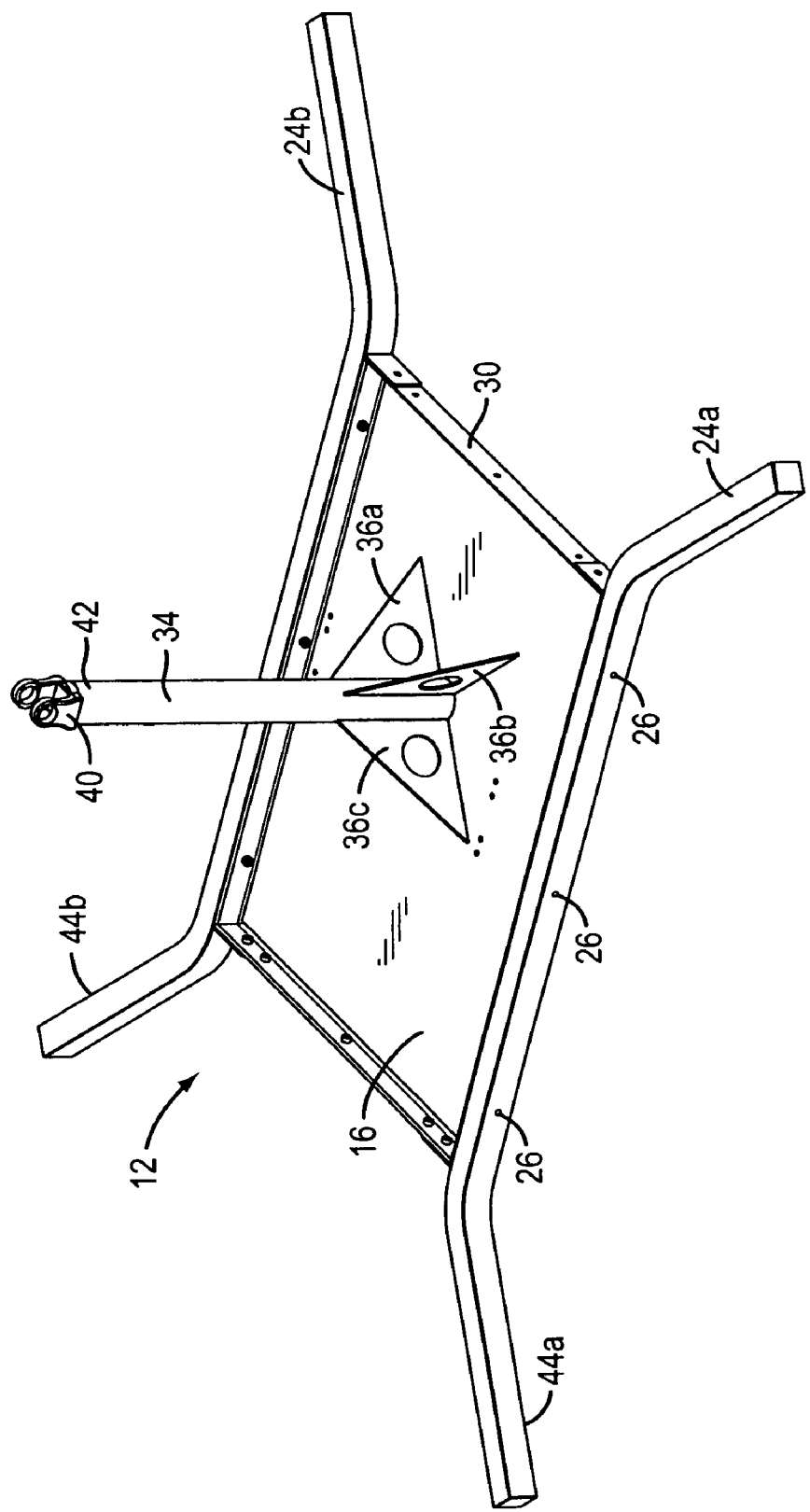
FIG. 2 is a view of the base of the motion platform.

In the invention, as shown in FIG. 1 and the subsequent figures, a motion platform, generally 10, is provided. The motion platform 10 may be used for providing relative motion between a base generally 12 and a sled, generally 14. The sled 14 is mounted for angular displacement relative to the base 12. That is, the sled generally 14 is pivotally supported on the base, generally 12 through a universal joint mounting connection. The universal joint may be, but is not limited to, a "cross-type" universal joint having two yokes and a "cross." Similar apparatus may include a ball-and-socket type connection, or any other type of rotary joint, or the like, that provides and allows pitch and roll motion.

A portion of the motion platform 10, that is the base 12, and one form of the deck 20 (FIG. 3) of the sled 14, is shown in FIGS. 1 through 4. In these figures the base 12 is a support structure having a floor 16 presenting a generally rectangular footprint. The base of the motion platform may have longitudinally directed side elements, generally configured as a straight middle section having end portions extending outwardly from the floor portion 16 of the base. The longitudinally directed side elements provide elements acting as forward facing outriggers such as 24a and 24b and rearward facing outriggers such as 44a and 44b. (FIG. 2) These extended portions of the longitudinally directed side elements are positioned to provide increased stability to the device. The forward facing outriggers 24a and 24b will extend forward and outwardly in one embodiment of the invention while the rearward facing outriggers 44a and 44b extend rearward and outwardly in one embodiment of the invention. Retention fasteners, such as, but not limited to bolts 26, are used to attach the longitudinally directed side members to the rest of the base structure. The base 12 will be supported on a floor surface, the ground, or other support surface.

The base may be equipped with an upstanding edge 30 around the periphery of the floor 16 of the base. The edge need not be a continuous edge but can have gaps.

A pillar 34 is supported on and affixed to the floor 16 of the base. The pillar 34 may be mounted on the longitudinal centerline of the base 12 as shown, but could be mounted off the centerline in certain situations. The pillar 34 is supported by gussets, three of the four gussets in this embodiment shown as 36a-c in FIG. 2, with these gussets being attached to the floor of the base.

The upper end 42 of the pillar 34 will support a first yoke 40 of a roller bearing universal joint. The first yoke 40 will be fixedly attached to the top or upper end of the pillar 34 such that a line through the bearing retainers of the first yoke will be transverse to the longitudinal centerline of the base 12. The first yoke 40 is fixedly attached to the pillar 34 so that the yoke 40 does not move relative to the pillar. In another form of the invention, a yoke similar to yoke 40 can be rotatably carried on the pillar 34.

Figure 3:
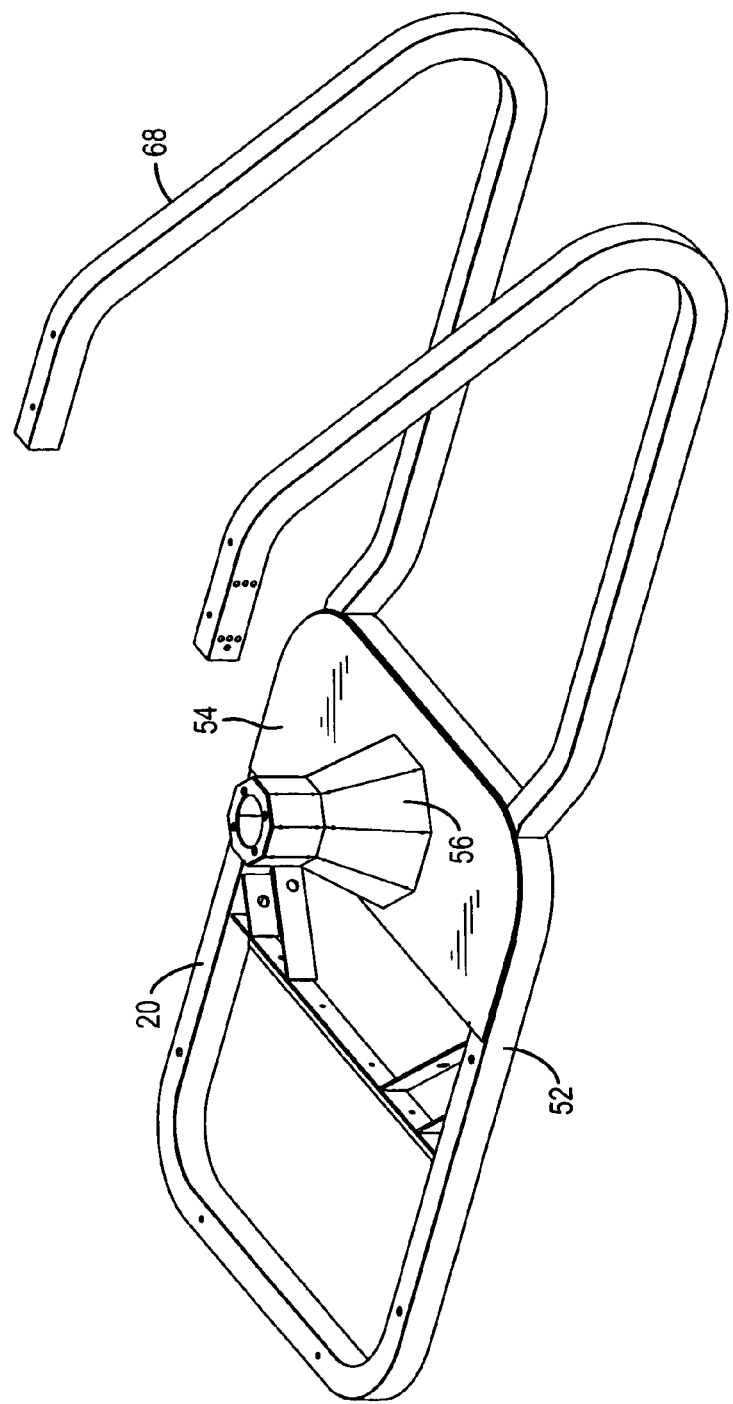
FIG. 3 is a view of a partially completed deck of the sled of the motion platform.

FIG. 3 is a view of a portion of the deck 20 of the sled without all of the elements of the sled installed on the deck. In this figure a perimeter frame 52 includes a first floor plate 54 that is attached to the perimeter frame 52. The first floor plate 54 is mounted in a zone at one end of deck and this first floor plate comprises less then the entire length of the deck defined by the perimeter frame 52. The first floor plate 54 will have a large through aperture formed in it. The aperture is not visible in this view. A stanchion 56, a hollow body having an open bottom and top that can be closed off, will be located and fixedly fastened over the aperture in the deck so that the interior of the stanchion is accessible through the aperture in the floor plate. A second floor plate will be fastened to the forward zone of the end of the deck not occupied by the first floor plate.

Two true axis of rotation or degrees of freedom; one being roll—the rotation about the longitudinal axis of the sled; and the second being pitch—rotation about the transverse axis of the sled; are two of the five degrees of freedom provided by the mechanism of the invention. In addition to roll and pitch, three other degrees of freedom, namely: heave, sway and surge, are simulated in the device presented herein.

As stated above, the hollow body stanchion 56, is supported over an aperture formed in the first floor plate 54. The stanchion may be welded or otherwise fastened, such as by, but not limited to, bolting, screwing, adhesively fastening, or the like, to the floor plate or other support structure, over the aperture in the first floor plate. This stanchion 56, which may be, but is not limited to, an octagonal structure, open at the bottom, is in the general shape of a cone. One embodiment is a cone with an octagonal cylinder at the upper area of the stanchion as shown in various figures provided herewith. In another embodiment the cylinder can be smooth or multi-sided. The stanchion has multiple sides, in one case as shown, there are eight sides, each a trapezoid or other shape, however the number of sides or the shape of the stanchion may be of one of many configurations, such as but not limited to, a three-sided structure or more than three-sided structure, or a structure having a curved sidewall configuration with a single curved sidewall or a curved sidewall of more than a single curved sidewall. The eight-sided stanchion shape may be less expensive to manufacture than a single curved sidewall cone shape and thus it is shown in the figures. A true cone having an open bottom and truncated and covered upper end could also be used in an embodiment of the device. Also, the base of the stanchion or cone need not be symmetrical or have a constant radius but may have an oblong or other designer dictated shape that would allow the sled to move a longer distance in one direction than in another direction before interference between the pillar and the opening edge of the stanchion or cone. Another embodiment of the invention is a vertical rectangle, instead of a cone shape, for the stanchion.

The stanchion 56 will have a closed top in one iteration of the invention. An open top stanchion is an alternative embodiment however a closed top has the advantage, in some circumstances, of preventing unfettered access to the inside of the stanchion from its top.

Figure 4:
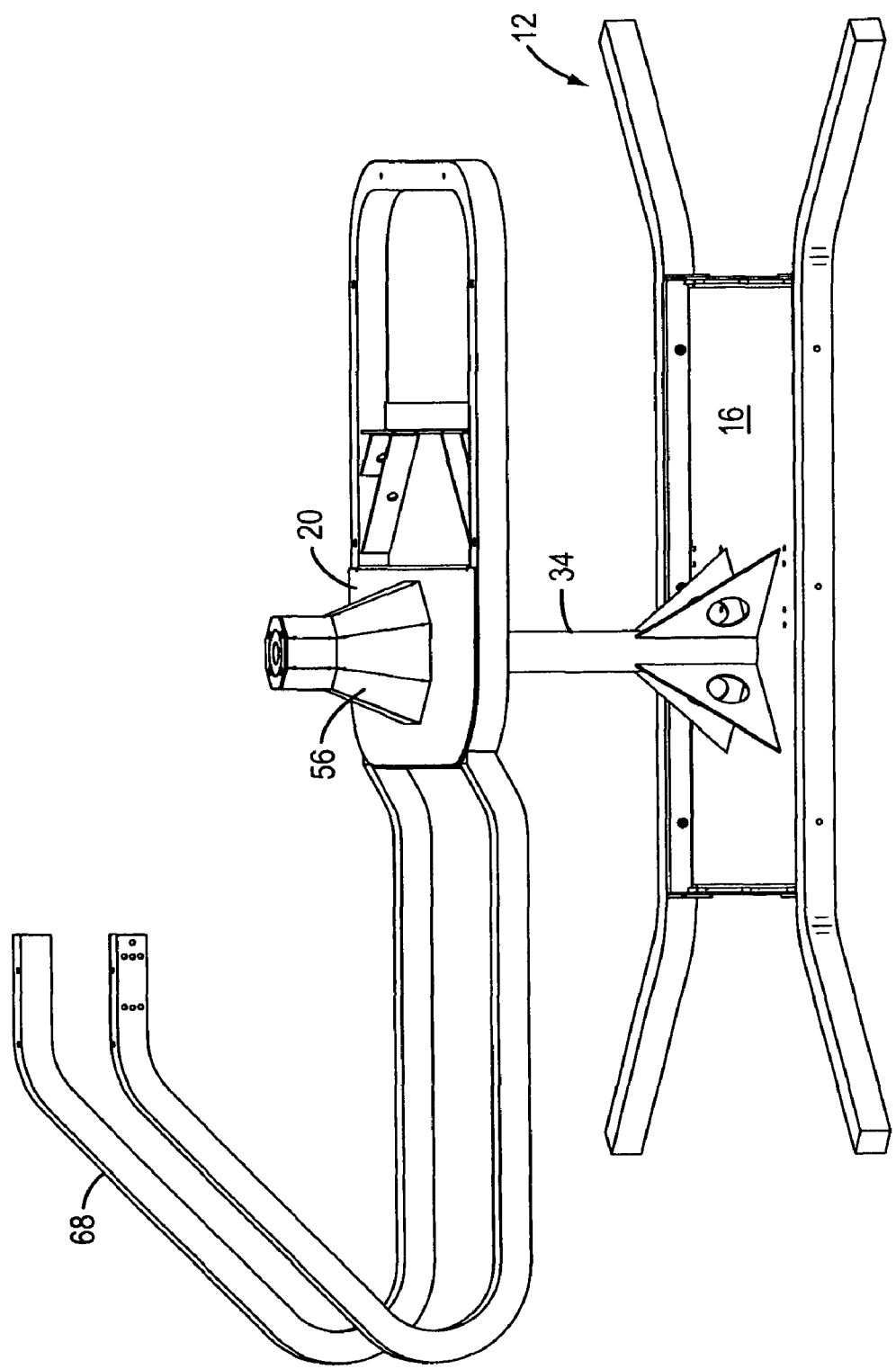
FIG. 4 is a view showing the partial deck of the sled positioned on the base of the motion platform.
Figure 5:
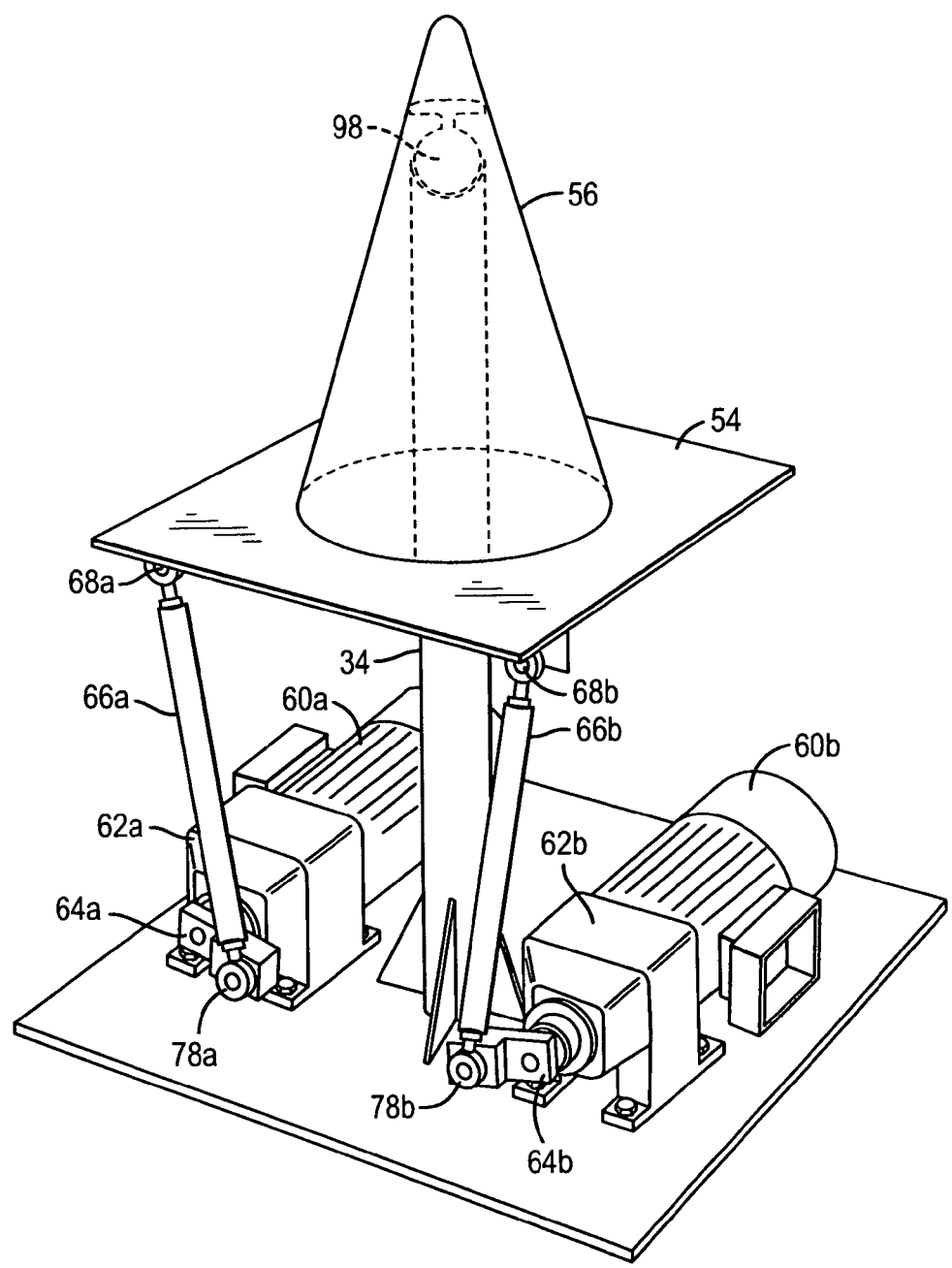
FIG. 5 is a pictorial representation of a stanchion, in the shape of a cone, supported on a pillar above a pair of sled motion actuation motors with gearheads and linkage.

FIG. 4 shows the partially completed deck of the sled 20 mounted in position on the pillar 34 that is supported on the floor of the base 16. The connection between the top of the pillar 34 and the stanchion 56 is made through a universal joint with one yoke, the first yoke identified as 40 above, mounted on the top of the pillar and transverse to the longitudinal centerline of the base 12. The second yoke and the cross of the universal joint, neither visible in any of the drawings but the structure and the operation of these portions of a conventional universal joint are well known to persons having skill in the art. An alternative embodiment is shown in FIG. 5 as item 98. This alternative embodiment is mounted to the inside of the stanchion 56 at the upper portion of the stanchion. Returning to the embodiment of FIG. 4, the second yoke of the universal joint is mounted such that a line through its bearing supports is transverse to the installed position of the first yoke 40 of the universal joint. The mounting directions of the first and the second yokes could each be rotated ninety degrees, or any other number of degrees in alternative embodiments, and the intended operation of the universal joint in this embodiment would not be affected. This universal joint mounting and positioning arrangement allows the deck 20 of the sled to pivot, but, in one embodiment, not rotate, on the pillar 34 forwardly, rearward, sideways and all points in-between. In one embodiment, with the universal joint fixedly mounded to the top of the pillar 34 and fixedly mounted to the top interior portion of the stanchion 56, there will be no yaw motion between the deck of the sled and the base 12 of the motion platform.

Returning to FIG. 1 various mounted elements of the motion platform are seen. Starting from the base, generally 12, a first motor 60a and a second motor 60b are mounted to the floor 16 of the base. These motors, which could be fractional motors, may be DC brush type motors, DC brushless motors, AC motors, stepper motors, or the like. The motors

60a and 60b, in one version of the invention may have gearhead reducers 62a and 62b that will receive rotary input from the output of the motors 60a and 60b.

The applicant believes that a combination motor and gearhead unit, such as a Nord ¼ Horsepower Gearhead AC motor, is a good choice for use in its motion platform as such motor-gearhead is compact, light weight, durable and may be less expensive than other motor and gearhead options. Each gearhead reducer output shaft will be coupled to a pitman arm such as those shown as 64a and 64b in FIG. 5. A second set of links, connecting rods 66a and 66b (FIG. 1, et al.), have a first end attached to the first set of pitman arms 64a and 64b, in one embodiment using ball joint rod end fittings at the attachment point, and the second end of each of the connecting rods 66a and 66b are attached, also through a ball joint rod end to the sled 14, and more definitively, to brackets mounted on the bottom surface of the first floor plate 54. In one embodiment of the invention these brackets may be hingedly mounted.

The motion platform will, in one version but not in every version, be compatible with U.S. residential voltage systems so that the motion platform can be plugged into home electrical distribution systems. Conventional three-prong plug and wiring elements will be associated with the motion platform to supply operating power to the unit. The wiring will connect to a junction box on the unit for distribution to various controllers, monitors, computers, and other systems as appropriate.

The sled, generally 14 in FIG. 1, is the support platform for a seat, such as the competition or racing seat 70, available from Corbeau Industries as well as many other racing seat suppliers, including a competition seat belt set, a pedal assembly 72, one model of pedal assembly available from Ball Racing Developments, Ltd. such as Model Speed 7, which may include an accelerator pedal, a brake pedal, a clutch pedal and a dead pedal.

Another vendor of steering wheels and pedal sets is Happ Controls, Inc.

A support structure including monitor support frame 68 which includes upwardly extending towers and angled legs supports a monitor 76, a control console, a dashboard and a steering wheel, among other components, such as but not limited to, a shifter, either shifter paddles or a conventional shift lever, a ventilation port, a camera facing the driver or the instruments on the console, or game control operator interfaces on the perimeter 52 of the deck of the sled. The monitor 76 may also include or be a video input module that will generate an image on the monitor, in this case a liquid crystal display, and appropriate drivers.

A driver input device, here a force feedback steering wheel 88, is also supported on the monitor support frame 68. A steering wheel of the type supplied by Logitech, such as Model G25 Racing Wheel is one option for an appropriate steering wheel. A set of monitors and controls, such as those as would be found in a race car or on an aircraft, such as, but not limited to, a gear shift lever, a tachometer, an oil pressure gauge, a water temperature gauge, a speedometer, a transmission status indicator and any other gauge, warning light, recording device, such as a GPS system or target acquisition screen, or other apparatus as is found in a race car, truck, airplane and the like. An adjustable rack 82, having one or more locking bolts 84, will provide adjustability, fore and aft, to the steering wheel 88 and other components that can be adjusted to accommodate drivers of different arm or body dimensions.

A safety switch, for the purpose of stopping motion of the motion platform, may be one of the controls carried on the dashboard with the other monitors and controls.

FIG. 5 is a simplified representation of the actuation devices of the motion platform. In this mock up or model the motors 60a and 60b are shown and the pitman arms 64a and 64b are clear. The pitman arms each have one end of the pitman arm mounted to one each of the output shafts of the gearhead reducers. These pitman arms 64a and 64b are parked in a neutral position such that the deck surface or first floor plate 54 is level and the cone 56 is substantially vertical, extend generally horizontally toward the centerline of the base on which the pillar 34 is mounted. Ball joint rod end connectors 78a and 78b are connected to second ends of the two pitman arm 64a and 64b. These rod ends 78a and 78b are also connected to lower ends of connecting rods 66a and 66b. These connecting rods 66a and 66b are therefore connected between the second ends of the pitman arm and mounting locations on the bottom of the first floor plate 54. Universal joint type rod ends can be used as an alternative to the ball joint rod ends.

Each of the pitman arms has its free end, the end that is not attached to the output shaft of each of the gear head reducers, pointing inwardly toward each other at a shallow angle below horizontal. If both of the pitman arms were pointing straight up they would, for purposes of this description, each be at zero degrees of rotational displacement. If each of the pitman arms were pointing straight down they each would be at one hundred-eighty degrees of rotational displacement. In one embodiment of the invention the pitman arms will be limited in rotational displacement to an arc of less than one hundred eighty degrees. For example, for the right side pitman arm 64a the rotational displacement may extend from about twenty degrees to about one hundred fifty-five degrees. For the left side pitman arm 64b the rotational displacement may be from about three hundred thirty-five degrees to about two hundred five degrees.

Limiting the range of the pitman arms to a rotational displacement of less than one hundred eighty degrees is one embodiment of the invention. This limitation may be broadened in other embodiments. For instance, it is contemplated by the inventor that it may be preferential to allow three hundred sixty degree rotation of the pitman arms attached to the gear head drives. By allowing such full rotational freedom of each arm, independent of the other arm, the gear head drives will be protected from damage due to interfering rotations between the drives. That is, since each drive is capable of three hundred sixty degrees of rotation by design, regardless of the position of the other gearhead drive, there will be no reasonable possibility of interference between the gearhead drives and the associated motors that would be detrimental to the drives or motors.

In operation, numerous payload displacement motions are possible with the simple configuration shown in FIG. 5. For instance, if the motor 60a drives the gearhead reducer 62a such that the pitman arm 64a is moved from the somewhat below horizontal position shown to a position where the pitman arm 64a is at twenty-five degrees and above the horizontal plane while at the same time motor 60b drives the gearhead reducer 62b such that the pitman arm 64b is moved from the somewhat below horizontal position shown to a position where the pitman arm 64b is at two hundred five degrees and below the horizontal plane the floor plate 54, representative of the entire sled, the sled will pivot on the universal joint 98 at the top of the pillar 34 toward the operator's left. The plate 54 will tilt along the major axis of the sled, in this case to the left.

When both pitman arms 64a and 64b are rotated upwardly to the same ending point, for instance, twenty five degrees for the right side pitman arm 64a and three hundred and thirty five degrees for the left side pitman arm 64b, the plate 54 will tilt transverse to the major axis of the sled on the universal joint 98 so that the front of the sled will rise. This motion is true pitch. Likewise, when both pitman arms 64a and 64b are rotated downwardly simultaneously the same amount the plate 54 will tilt in the plane of the minor axis of the sled on the universal joint 98 but this time the front of the sled will dip and the rear of the sled will rise. This is also true pitch. If however both pitman arms 64a and 64b are rotated simultaneously but at different rates and rotational angles the plate 54 will tilt in a direction or displacement partially transverse to the major axis of the sled and partially in the major axis of the sled on the universal joint 98 depending on the relative motion, speed and angular displacement of the pitman arms relative to each other. This allows a point on the plate 54, representative of a point on the sled, to move on an arc from horizontal in two axes, namely in roll and in pitch. By the speed and direction of the pitman arm movement heave, sway and surge can be simulated. Heave is generally movement up and down. Moving left and/or right is sway. Surge is movement forward and backward. In this invention heave, sway and surge can each be, and are, simulated.

Figure 6:
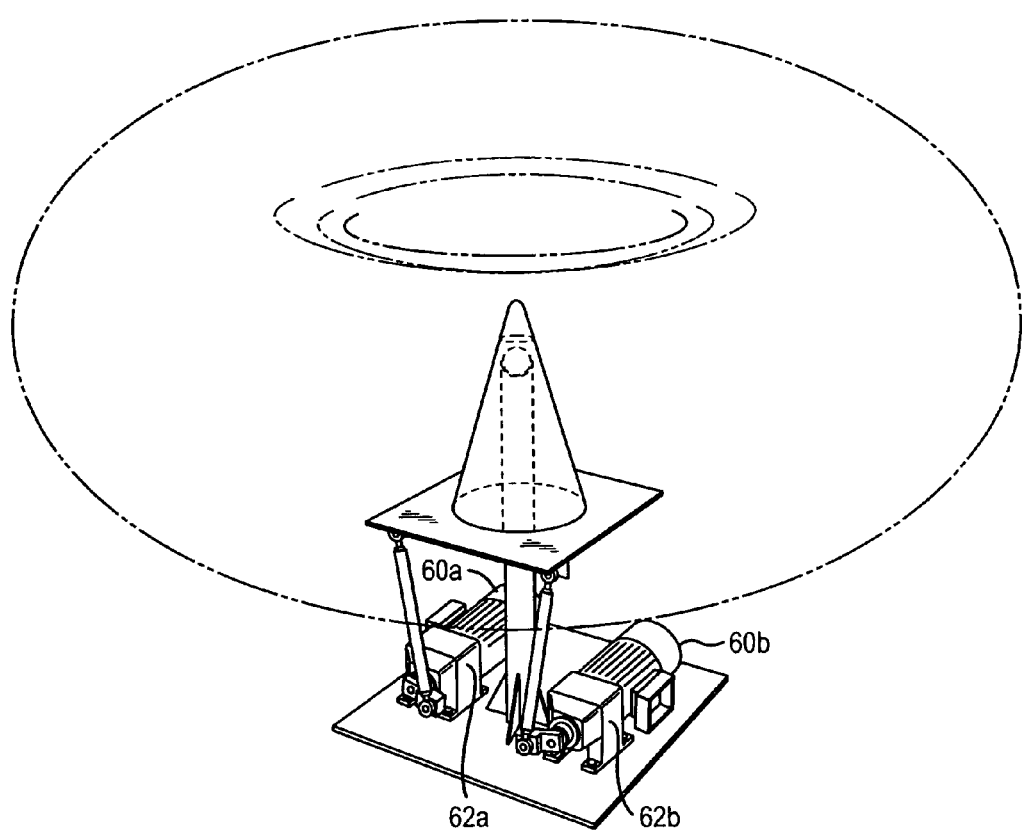
FIG. 6 is a pictorial representation of the conceptual distribution of mass geometry.

In FIG. 6 a torus is shown superimposed over the cone of the device shown in FIG. 5. This torus represents the distribution of the mass of the payload around the pivotal center represented by the center of the universal joint mounted at the top of the pillar and to the upper inside location of the stanchion. The area described by the torus represents the mass distribution of the payload relative to the pivotal center at the top of the pillar. This figure shows that the mass of the payload is equally distributed around the pivotal center of the device. Thus for any displacement of the payload the mass that needs to be moved is balanced by an equal mass on the opposite side of the pivotal center. In operation it is desirable to minimize the distance from the center of mass to the pivotal center of the device. As this distance is minimized the torus will become smaller in horizontal diameter as well as in the vertical diameter. At the outer surface of the torus the balanced mass is at its furthest distance from the pivotal center but it is counterbalanced by an equal mass one hundred and eighty degrees away from the first mass. In this situation the force needed to move the payload on the pivotal center is minimized as the equal distribution of the mass means that the opposed mass will be added to the horsepower delivered by the gearhead motors to move the payload. It should also be noted that as the center of mass moves toward the interior of the torus the torus will become smaller which represents that the force needed to move the payload will decrease.

There will be a processor associated with the motion platform. In one embodiment of the invention the processor will be a dedicated microprocessor controller associated with the motion platform. In another version the processor could be a desktop, laptop, or other packaged processor that can be associated with the motion platform and connected thereto by hardwire or wireless communication options. The processor will include a controller that will control the output or response of the motors and the gear heads to move the deck on the universal joint responsive to inputs from software running the simulated game. Software, some that is currently available in the consumer market, is augmented and interfaced using software that is unique to the control of the motion platform presented here. Electronically integrated visual displays, projected or presented on at least one high resolution monitor, and sound presentation systems, such as, but not limited to speakers mounted in the vicinity of the motion platform, seat mounted head phones or helmet housed speakers, or the like will be used in conjunction with the motion of the sled to add to the simulated reality of the motion platform.

Sound delivery to the operator is accomplished using THX surround sound or other sound delivery schemes of similar high performance capability.

A plurality of sensors such as, but not limited to, shaft encoders or linear encoders, may be associated with the motion platform. There may be shaft encoders associated with the motor, the output shaft of the gearhead reducer, and/or linear recorders associated with the pitman arm links, or with the sled to sense its position and to provide other input information to the controller associated with the motion platform and its controls.

A safety switch may be associated with the base of the motion platform. This safety switch would be responsive to the base of the platform not being in proper engagement with the supporting floor under the motion platform.

Figure 7:
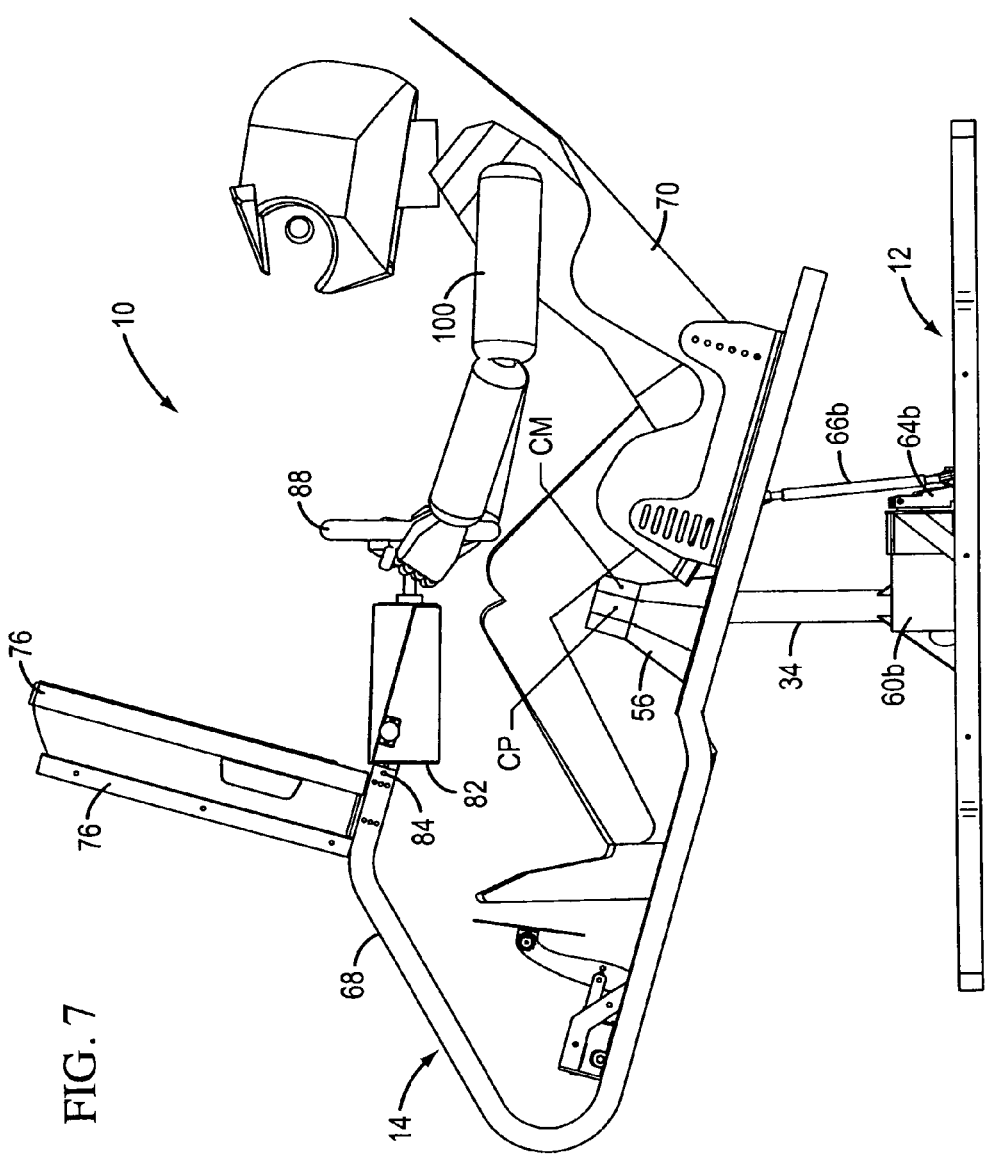
FIG. 7 is a simplified representation of a person in position on the sled of the motion platform in a negative rearward inclined position.
Figure 8:
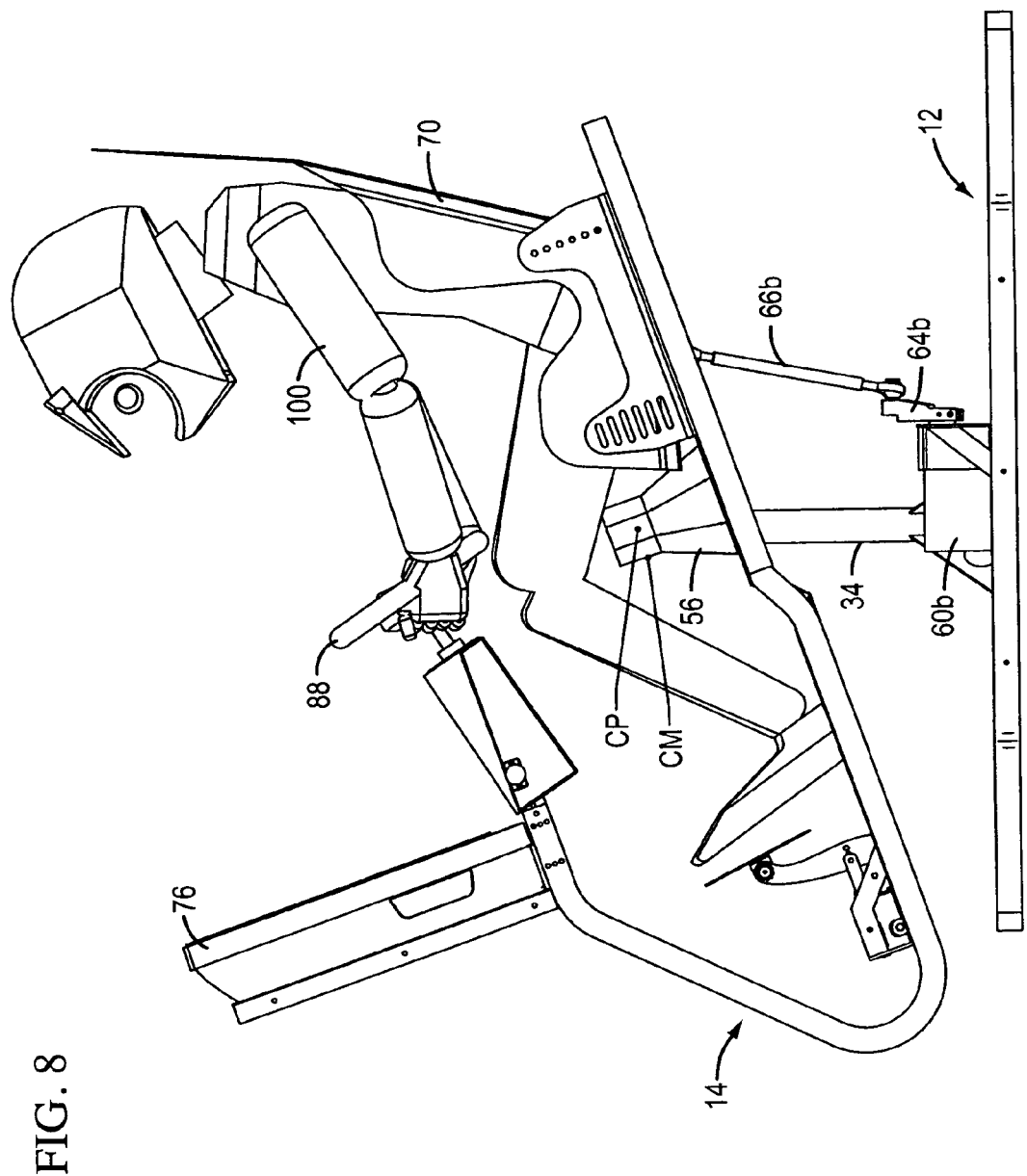
FIG. 8 is a simplified representation of a person in position on the sled of the motion platform with the platform in a forward inclined position.
Figure 9:
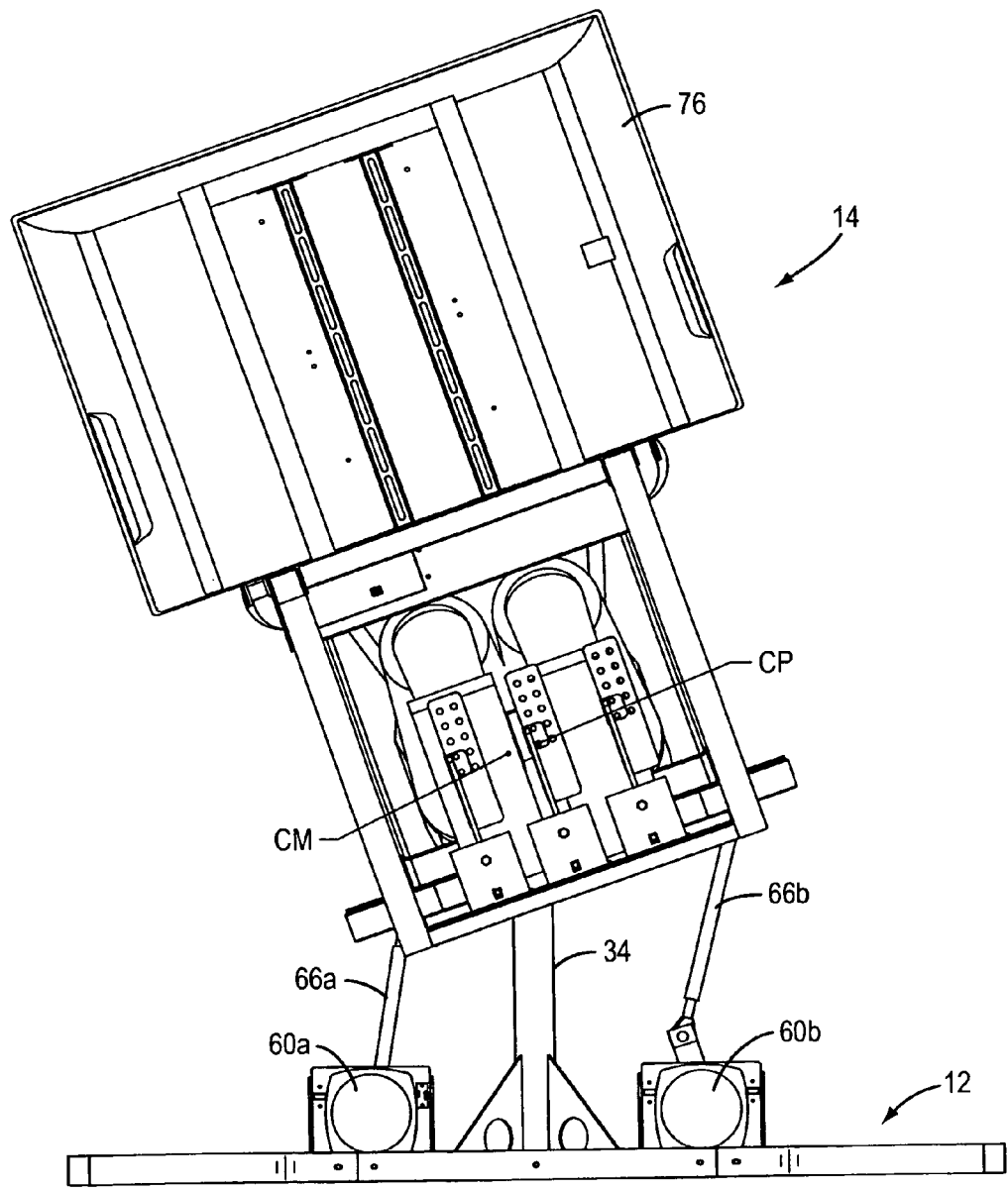
FIG. 9 is a simplified representation of a person in position on the sled of the motion platform with the platform in a tilt to the side position.

FIGS. 7, 8 and 9 are pictorial representations of a motion platform generally 10, with an operator 100, in this case a person driving a racecar simulator, sitting in the seat 70. These three figures show three representative positions of the payload, that being the sled and the operator taken together, on and relative to the base generally 12. In each of these figures a center of mass, labeled in the figures as "CM," is shown in different locations in each of the three figures. The CM is calculated by finding the center of mass of the payload, that being the sled and an operator seated in the seat 70. This calculated CM may be above the pivot point, at the same level as the pivot point, or below the pivot point, but in this invention, the CM is intended to be as close to the pivot point as possible as the payload is moved through various degrees of freedom afforded by the associated linkage and the linkage deployment between the pitman arm links and the bottom of the sled.

In a preferred embodiment, as shown in FIGS. 7-9, the tipping of the sled and the driver or rider forward, rearward or to either side, or in a combination of these directions will cause the rider or driver to experience the feeling of acceleration, deceleration and centrifugal forces. The tipping of the sled will cause this sensation of acceleration, deceleration or centrifugal force due to gravitational forces acting on the rider or driver as the sled is tipped forward, backward or to the side, or any combination of displacements of the sled and driver from horizontal.

In FIG. 7 the sled, generally 14, is in full pitch pose with the front of the sled near maximum elevation. Each of the pitman arms, such as the one shown as 64b will be below horizontal. In quickly getting to this pose the driver will sense acceleration. It should be noted that in most situations, where the driver is concentrating on the game and all the action is being displayed on the monitor, the driver's eye location will be looking at the monitor 76 and the relative distance between the driver's eye and the monitor will be substantially constant. In this figure the center of mass CM, is located aft of the pivotal center CP of the sled on the universal joint. Both the center of mass, CM, and the pivotal center, CP, are close and this is desirable as the energy needed to move the payload to the next pose, such as is shown in FIG. 7, is relatively small as there are no long force vectors to overcome in moving from one pose to another.

In FIG. 8 the payload, generally 14, is in full pitch pose with the front of the sled near minimum elevation. Each of the pitman arms, such as the one shown as 64b will be above horizontal. In quickly getting to this pose the operator will sense deceleration. In this figure the center of mass CM is located fore of the pivotal center CP of the payload. Both centers, the CM and CP, are close to each other. This, as above, is similarly beneficial as the energy needed to move the payload to the next pose is relatively small as there are no long force vectors to overcome.

In FIG. 9 the payload, including the rider or driver, generally 14, is in full roll pose with the payload near maximum starboard roll. One of the pitman arms, pitman arm 64a will be displaced at or below the horizontal plane (observed from the front of the sled as shown) and the other pitman arm 64b will be displaced at or above the horizontal plane depending on the position of the other pitman arm 64a. In quickly getting to this pose the operator will sense centrifugal or g-forces sensed in a sharp turn.

As stated above, the sense of the centrifugal force is due to the gravitational force on the rider. The rider or driver will experience the tipping of the sled by his sense of gravitational forces acting on his or her body as the sled is tipped but she/he will feel the gravitational force as centrifugal force as if the racecar is going through a turn. This is also the case with the tipping of the sled downwardly in the front (FIG. 8) to simulate deceleration or rearwardly where the sled is down in the rear as shown in FIG. 7, to simulate acceleration.

Returning to FIG. 9, in this figure the center of mass CM is located starboard of the pivotal center CP of the payload. As in the two poses described above both centers, the CM and CP, are close to each other. Here also, the energy needed to move the payload to the next pose is relatively small as there are no long force vectors to overcome.

While the invention is described herein in terms of preferred embodiments and generally associated methods, the inventor contemplates that alterations and permutations of the preferred embodiments and methods will become apparent to those skilled in the art upon a reading of the specification and a study of the drawings. For instance, a pair of one-piece linear ball screw gear drive with six inches of travel could be used in place of the gearhead, pitman arm and connecting rod. This is a higher cost alternative to the embodiment set forth above.

Accordingly, neither the above description of preferred exemplary embodiments nor the abstract defines or constrains the invention. Rather, the issued claims variously define the invention. Each variation of the invention is limited only by the recited limitations of its respective claim, and equivalents thereof, without limitation by other terms not present in the claim.

What is claimed is:

1. A method of enhancing performance of a motion-generating device accommodating an occupant, the device having a base, an upstanding column and a sled, the occupant accommodated on the sled, the method comprising the acts of:
   locating a pivotal center of motion on the upstanding column in a position above the base of the motion generating device;
   locating the position of a center of mass, the center of mass calculated from the mass of the sled and the mass of an exemplar occupant accommodated on the sled;
   mounting the sled on the pivotal center of motion such that the located center of mass is proximate the pivotal center of motion of the motion generating device;
   providing a prime mover to impart motion to the sled, the prime mover connected to the sled through linkage.

2. The method set forth in claim 1 further comprising the acts of:
   positioning a pivotable joint on the column to locate the pivotal center of motion;
   mounting the sled to the pivotable joint such that the center of mass is proximate the pivotable center of motion.

3. The method set forth in claim 1 wherein mounting the platform on the pivotal center of motion such that the located center of mass is proximate the pivotal center of the motion generating device further comprises the act of:
   minimizing force necessary to impart motion to the sled and the occupant, the combined mass of the sled and the occupant comprising a payload, by minimizing the proximate distance between the center of mass of the payload and the pivotal center of motion.

4. The method set forth in claim 1 further comprising the act of:
   providing a stanchion on the sled, the stanchion providing a mounting location for attachment of the upstanding column to the interior of the stanchion through the pivotal joint whereby locating the center of mass proximate the pivotal center of motion is realized.

5. The method set forth in claim 4 wherein the stanchion is positioned over the upstanding column and the pivotal center of motion is located inside the stanchion.

6. The method set forth in claim 1 further comprising the act of:
   minimizing the force necessary to impart motion to a sled and an occupant of the sled, the combination of the sled and the occupant of the sled comprising a payload;
   enabling the act of locating the center of mass of the payload proximate the pivotal center of motion by mounting the sled on the pivotal center of motion such that the located center of mass of the payload is proximate the pivotal center of motion of the motion generating device.

7. A motion platform having two true degrees of freedom, the motion platform comprising:
   a base;
   a pillar, having an upper end, the pillar fixedly mounted to and extending from the base;
   a universal joint pivotally attached to the upper end of the pillar;
   a sled having a deck surface, the deck surface including an aperture;
   a stanchion, having an upper portion, the stanchion mounted to the deck surface of sled, the stanchion covering at least a portion of the aperture in the deck surface and extending above the deck surface of the sled;
   the universal joint, pivotally attached to the upper end of the pillar, is further attached to the upper portion of the stanchion.

8. The motion platform in accordance with claim 7 wherein the universal joint comprises a universal joint cross element having a center, the center of the universal joint cross element defining a pivot center.

9. The motion platform in accordance with claim 8 wherein the payload has a center of mass, the center of mass of the payload vertically aligned with the pivot center.

10. The motion platform in accordance with claim 9 wherein the center of mass of the payload is proximate the pivot center of the payload in all angular displacements of the payload relative to the base of the motion platform.

11. The motion platform in accordance with claim 10 wherein the center of mass of the payload is located within the wall of a virtual cone having its tip coinciding with the pivot center, the cone major axis aligned with the major axis of the pillar.

12. The motion platform in accordance with claim 11 the virtual cone having a sixty-degree angle between the major axis of the virtual cone and the wall of the virtual cone.

13. The motion platform in accordance with claim 10 wherein the stanchion has base and a top and the height of the stanchion from the base to the top is between five and fifteen inches.

14. The motion platform in accordance with claim 13 wherein the universal joint is mounted in the upper portion of the stanchion such that the pivot center defined by the center of the cross of the universal joint is within two inches from the top of the stanchion.

15. The motion platform in accordance with claim 9 wherein the sled element of the payload contacts only the universal joint when the motion platform is unpowered and stationary.

16. A motion platform comprising;
an upwardly extending pillar having an upper end;
a universal joint attached to the upwardly extending pillar;
a stanchion mounted to the universal joint attached to the pillar;
a sled having a deck surface, the stanchion mounted to the sled and the stanchion extending above the deck surface of the sled.

17. The motion platform in accordance with claim 16 further comprising:
a base,
the pillar attached to the base.

18. The motion platform in accordance with claim 17 wherein the stanchion comprises a multi-sided structure having an open bottom portion, the stanchion carried on the pillar with the open end of the stanchion surrounding the pillar.

19. The motion platform in accordance with claim 18 wherein the stanchion is a hollow polyhedron.

20. The motion platform in accordance with claim 19 wherein the hollow polyhedron has eight sides, a closed top and an open bottom.

21. A method of supporting a payload on a motion platform, the motion platform having a base, the method comprising the acts of:
providing an upwardly extending pillar extending from the base;
providing a universal joint on the pillar;
attaching the pillar to the interior of a stanchion carried on the payload, the attachment comprising attaching the universal joint to the stanchion.

22. A motion platform comprising a sled having a deck and a base having a pillar, the method of supporting the sled portion of the motion platform on the pillar of the base comprising the acts of:
attaching a hollow polyhedron to the deck of the sled portion of the motion platform with the polyhedron extending above the deck;
attaching the pillar of the base to the polyhedron at a point of the polyhedron vertically above the deck; whereby the sled of the motion platform is supported on the pillar of the base.

23. A method of enhancing performance of a motion-generating device, the device having a base, an upstanding column carried on the base and a sled supported on the column, the sled for accommodating an occupant, the method of enhancing the performance of the motion-generating device comprising the acts of:
locating a pivotal center of motion of the sled on the column above the base of the motion generating device;
calculating the center of mass from the mass of the sled and the mass of an exemplar occupant accommodated on the sled;
locating the position of the calculated center of mass;
mounting the sled at the pivotal center of motion on the column such that the center of mass of the combined sled and exemplar occupant is within a one inch radius from the pivotal center of motion of the motion generating device.

* * * * *